United States Patent
Matsuda et al.

(10) Patent No.: US 8,779,043 B2
(45) Date of Patent: Jul. 15, 2014

(54) SILICONE RESIN COMPOSITION, SILICONE RESIN SHEET, OPTICAL SEMICONDUCTOR ELEMENT DEVICE, AND PRODUCING METHOD OF SILICONE RESIN SHEET

(71) Applicants: Hirokazu Matsuda, Osaka (JP); Ryuichi Kimura, Osaka (JP); Hiroyuki Katayama, Osaka (JP)

(72) Inventors: Hirokazu Matsuda, Osaka (JP); Ryuichi Kimura, Osaka (JP); Hiroyuki Katayama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/649,716

(22) Filed: Oct. 11, 2012

(65) Prior Publication Data

US 2013/0105997 A1    May 2, 2013

(30) Foreign Application Priority Data

Oct. 31, 2011    (JP) .................................. 2011-238215

(51) Int. Cl.
*C08L 83/04*    (2006.01)
(52) U.S. Cl.
USPC ............. 524/236; 525/477; 525/478; 528/15; 528/31; 528/32
(58) Field of Classification Search
None
See application file for complete search history.

(56) References Cited

U.S. PATENT DOCUMENTS

| | | | | |
|---|---|---|---|---|
| 4,603,168 | A | * | 7/1986 | Sasaki et al. .................... 522/18 |
| 2004/0116640 | A1 | | 6/2004 | Miyoshi |
| 2005/0212008 | A1 | | 9/2005 | Miyoshi |
| 2008/0276983 | A1 | * | 11/2008 | Drake et al. .................. 136/251 |

FOREIGN PATENT DOCUMENTS

| | | |
|---|---|---|
| EP | 1 424 363 A1 | 6/2004 |
| EP | 2 024 439 A1 | 2/2009 |
| EP | 2 196 503 A1 | 6/2010 |
| JP | 2000-198930 A | 7/2000 |
| JP | 2004-186168 A | 7/2004 |
| JP | 2008-150437 A | 7/2008 |
| JP | 2009-084511 A | 4/2009 |
| WO | 2007/132932 A1 | 11/2007 |

OTHER PUBLICATIONS

European Search Report issued in counterpart EP Application No. 12189001.6 dated Mar. 6, 2013.

* cited by examiner

*Primary Examiner* — Marc Zimmer
(74) *Attorney, Agent, or Firm* — Sughrue Mion, PLLC

(57) ABSTRACT

A silicone resin composition contains a first organopolysiloxane having, in one molecule, both at least two ethylenically unsaturated hydrocarbon groups and at least two silanol groups; a second organopolysiloxane having, in one molecule, at least two hydrosilyl groups without having an ethylenically unsaturated hydrocarbon group; a hydrosilylation catalyst; and a hydrosilylation retarder.

5 Claims, 1 Drawing Sheet

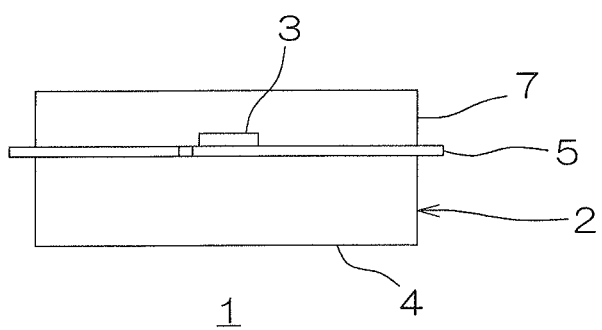

SILICONE RESIN COMPOSITION, SILICONE RESIN SHEET, OPTICAL SEMICONDUCTOR ELEMENT DEVICE, AND PRODUCING METHOD OF SILICONE RESIN SHEET

CROSS-REFERENCE TO RELATED APPLICATION

The present application claims priority from Japanese Patent Application No. 2011-238215 filed on Oct. 31, 2011, the contents of which are hereby incorporated by reference into this application.

BACKGROUND OF THE INVENTION

1. Field of the Invention

The present invention relates to a silicone resin composition used in encapsulation of an optical semiconductor element, a silicone resin sheet obtained by semi-curing the silicone resin composition, an optical semiconductor element device having an encapsulating layer obtained by curing the silicone resin composition, and a method for producing a silicone resin sheet.

2. Description of Related Art

Conventionally, as an encapsulating material for encapsulating an optical semiconductor element such as a light emitting diode (LED), a silicone resin having an excellent transparency has been used.

As such an encapsulating material, for example, a silicone resin composition containing an organopolysiloxane, which contains an alkenyl group, and an organohydrogenpolysiloxane has been known (ref: for example, Japanese Unexamined Patent Publications No. 2000-198930, No 2004-186168, and No. 2008-150437).

The silicone resin composition is usually in a liquid state at room temperature, and an alkenyl group in the organopolysiloxane and a hydrosilyl group in the organohydrogenpolysiloxane are allowed to undergo an addition reaction to be cured by heating in the presence of a platinum catalyst.

In order to encapsulate the optical semiconductor element using the silicone resin composition, for example, a method in which the silicone resin composition fills inside a housing in which the optical semiconductor element is disposed to be cured has been known.

However, in this method, there may be a case where the viscosity or the like of the silicone resin composition in a liquid state changes in accordance with the operating environment, so that it may be difficult to stably fill with the silicone resin composition.

Therefore, for example, a method for fabricating an optical semiconductor encapsulating sheet by heating and drying an encapsulating sheet composition, which contains a silicone resin having a cyclic ether-containing group (to be specific, a glycidyl group, an epoxycyclohexyl group, and an oxetane group) and a thermal curing agent to be reacted with the cyclic ether-containing group, and encapsulating an optical semiconductor element using the optical semiconductor encapsulating sheet has been proposed (ref: for example, Japanese Unexamined Patent Publication No. 2009-84511).

SUMMARY OF THE INVENTION

As described in Japanese Unexamined Patent Publication No. 2009-84511, when the optical semiconductor encapsulating sheet is fabricated using the silicone resin composition described in Japanese Unexamined Patent Publications No. 2000-198930, No. 2004-186168, and No. 2008-150437, it has been considered that the addition reaction of the alkenyl group with the hydrosilyl group is controlled, so that the silicone resin composition is brought into a semi-cured state.

However, in such a case, it is difficult to control the reaction of the alkenyl group with the hydrosilyl group in the silicone resin composition and therefore, it is difficult to uniformly semi-cure the silicone resin composition.

It is an object of the present invention to provide a silicone resin composition which is capable of being uniformly semi-cured, a silicone resin sheet which is obtained by semi-curing the silicone resin composition, an optical semiconductor element device which has an encapsulating layer obtained by curing the silicone resin composition, and a method for producing a silicone resin sheet.

A silicone resin composition of the present invention contains a first organopolysiloxane having, in one molecule, both at least two ethylenically unsaturated hydrocarbon groups and at least two silanol groups; a second organopolysiloxane having, in one molecule, at least two hydrosilyl groups without having an ethylenically unsaturated hydrocarbon group; a hydrosilylation catalyst; and a hydrosilylation retarder.

In the silicone resin composition of the present invention, it is preferable that the hydrosilylation retarder contains a quaternary ammonium hydroxide.

A silicone resin sheet of the present invention is obtained by semi-curing the above-described silicone resin composition.

In the silicone resin sheet of the present invention, it is preferable that the compressive elastic modulus thereof is 1000 Pa to 2 MPa.

An optical semiconductor element device of the present invention includes an optical semiconductor element and an encapsulating layer which is obtained by curing the above-described silicone resin sheet and encapsulates the optical semiconductor element.

A method for producing a silicone resin sheet of the present invention includes the steps of applying the above-described silicone resin composition onto a substrate and heating the silicone resin composition applied onto the substrate at 20 to 200° C. for 0.1 to 120 minutes.

According to the silicone resin composition of the present invention, the first organopolysiloxane having, in one molecule, both at least two ethylenically unsaturated hydrocarbon groups and at least two silanol groups; the second organopolysiloxane having, in one molecule, at least two hydrosilyl groups without having an ethylenically unsaturated hydrocarbon group; the hydrosilylation catalyst; and the hydrosilylation retarder are contained.

Therefore, it is possible to suppress a hydrosilylation reaction of the ethylenically unsaturated hydrocarbon group in the first organopolysiloxane with the hydrosilyl group in the second organopolysiloxane by the hydrosilylation retarder and to progress a condensation reaction of the silanol group in the first organopolysiloxane with a silanol group produced by allowing the hydrosilyl group in the second organopolysiloxane to react with water.

As a result, the silicone resin composition can be uniformly semi-cured.

BRIEF DESCRIPTION OF THE DRAWINGS

FIG. 1 shows a schematic configuration view of an optical semiconductor element device.

DETAILED DESCRIPTION OF THE INVENTION

A silicone resin composition of the present invention contains, as essential components, a first organopolysiloxane, a second organopolysiloxane, a hydrosilylation catalyst, and a hydrosilylation retarder.

The first organopolysiloxane has, in one molecule, both at least two ethylenically unsaturated hydrocarbon groups and at least two silanol groups (HO—Si≡, ref: the following formula (1)). To be specific, the first organopolysiloxane includes an organopolysiloxane containing a hydroxy group at its end and an ethylenically unsaturated hydrocarbon group in its side chain represented by the following formula (1), an organopolysiloxane containing an ethylenically unsaturated hydrocarbon group at its end and a hydroxy group in its side chain represented by the following formula (2), and an organopolysiloxane containing a hydroxy group and an ethylenicaly unsaturated hydrocarbon group in its side chain represented by the following formula (3).

Formula (1):

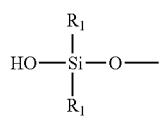
A

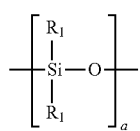
B

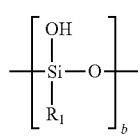
C

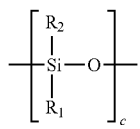
D

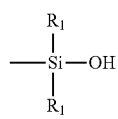
E (where, in formula, A to E represent a constituent unit, A and E represent an end unit, and B to D represent a repeating unit. $R_1$ represents a monovalent hydrocarbon group selected from a saturated hydrocarbon group and an aromatic hydrocarbon group. $R_2$ represents a monovalent ethylenically unsaturated hydrocarbon group. "a" represents an integer of 0 or 1 or more, "b" represents an integer of 0 or 1 or more, and "c" represents an integer of 2 or more.)

Formula (2):

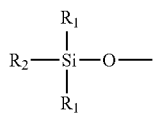
F

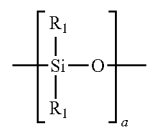
G

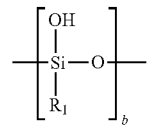
H

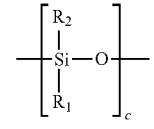
I

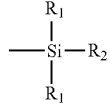
J (where, in formula, F to J represent a constituent unit, F and J represent an end unit, and G to I represent a repeating unit. $R_1$ represents a monovalent hydrocarbon group selected from a saturated hydrocarbon group and an aromatic hydrocarbon group. $R_2$ represents a monovalent ethylenically unsaturated hydrocarbon group. "a" represents an integer of 0 or 1 or more, "b" represents an integer of 2 or more, and "c" represents an integer of 0 or 1 or more.)

Formula (3):

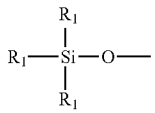
K

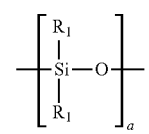
L

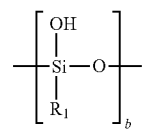
M

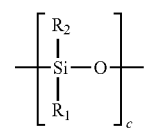
N

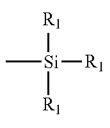
O (where, in formula, K to O represent a constituent unit, K and O represent an end unit, and L to N represent a repeating unit. $R_1$ represents a monovalent hydrocarbon group selected from a saturated hydrocarbon group and an aromatic hydrocarbon group. $R_2$ represents a monovalent ethylenically unsaturated hydrocarbon group. "a" represents an integer of 0 or 1 or more, "b" represents an integer of 2 or more, and "c" represents an integer of 2 or more.)

Examples of the saturated hydrocarbon group include a straight chain or branched chain alkyl group having 1 to 6 carbon atoms (such as a methyl group, an ethyl group, a propyl group, an isopropyl group, a butyl group, an isobutyl group, a pentyl group, and a hexyl group) and a cycloalkyl group having 3 to 6 carbon atoms (such as a cyclopentyl group and a cyclohexyl group).

An example of the aromatic hydrocarbon group includes an aryl group having 6 to 10 carbon atoms (such as a phenyl group and a naphthyl group).

In the above-described formulas (1) to (3), the number of carbon atoms in the monovalent hydrocarbon group represented by $R_1$ is, for example, 1 to 20, or preferably 1 to 10.

In the above-described formulas (1) to (3), $R_1$s may be the same or different from each other. Preferably, $R_1$s are the same.

In the above-described formulas (1) to (3), as the monovalent hydrocarbon group represented by $R_1$, preferably, in view of transparency, thermal stability, and light resistance, a straight chain alkyl group is used, more preferably, a straight chain alkyl group having 1 to 6 carbon atoms is used, or particularly preferably, a methyl group is used.

In the above-described formulas (1) to (3), examples of the ethylenically unsaturated hydrocarbon group represented by $R_2$ include a substituted or unsubstituted ethylenically unsaturated hydrocarbon group. Examples thereof include an alkenyl group and a cycloalkenyl group.

An example of the alkenyl group includes an alkenyl group having 2 to 10 carbon atoms such as a vinyl group, an allyl group, a propenyl group, a butenyl group, a pentenyl group, a hexenyl group, a heptenyl group, and an octenyl group.

An example of the cycloalkenyl group includes a cycloalkenyl group having 3 to 10 carbon atoms such as a cyclohexenyl group and a norbornenyl group.

In the above-described formulas (1) to (3), the number of carbon atoms in the ethylenically unsaturated hydrocarbon group represented by $R_2$ is, in view of transparency and heat resistance of the cured product, for example, 2 to 20, or preferably 2 to 10.

In the above-described formulas (1) to (3), $R_2$s may be the same or different from each other. Preferably, $R_2$s are the same.

In the above-described formulas (1) to (3), as the ethylenically unsaturated hydrocarbon group represented by $R_2$, in view of reactivity with the hydrosilyl group, preferably, an alkenyl group is used, more preferably, an alkenyl group having 2 to 5 carbon atoms is used, or even more preferably, vinyl is used.

In the above-described formula (1), "a" is, for example, 0 to 10000, or preferably 0 to 1000; "b" is, for example, 0 to 1000, or preferably 0 to 100; and "c" is, for example, 2 to 1000, or preferably 2 to 100.

In the above-described formula (2), "a" is, for example, 0 to 10000, or preferably 1 to 1000; "b" is, for example, 2 to 1000, or preferably 2 to 100; and "c" is, for example, 0 to 1000, or preferably 0 to 100.

In the above-described formula (3), "a" is, for example, 0 to 10000, or preferably 0 to 1000; "b" is, for example, 2 to 1000, or preferably 2 to 100; and "c" is, for example, 2 to 1000, or preferably 2 to 100.

Examples of the first organopolysiloxane include a straight chain structure of vinyl-terminated polymethylhydroxysiloxane (corresponding to the above-described formula (2)), vinyl-terminated methylhydroxysiloxane-dimethylsiloxane copolymer (corresponding to the above-described formula (2)), vinyl-terminated polyphenyl (dimethylhydroxy) siloxane (corresponding to the above-described formula (2)), vinyl-terminated methylhydroxysiloxane-phenylmethylsiloxane copolymer (corresponding to the above-described formula (2)), vinyl-terminated methylhydroxysiloxane-octylmethylsiloxane copolymer (corresponding to the above-described formula (2)), hydroxy group-terminated vinylmethylsiloxane-dimethylsiloxane copolymer (corresponding to the above-described formula (1)), and hydroxy group-terminated polyvinylmethylsiloxane (corresponding to the above-described formula (1)). The molecular structure of the first organopolysiloxane is not limited to the above-described straight chain structure and may be, for example, a cyclic chain structure, a branched chain structure, or a three dimensional network structure.

Of the first organopolysiloxanes, preferably, an organopolysiloxane containing a hydroxy group at its end and an ethylenically unsaturated hydrocarbon group in its side chain represented by the above-described formula (1) is used, or more preferably, a hydroxy group-terminated vinylmethylsiloxane-dimethylsiloxane copolymer is used.

The first organopolysiloxanes can be used alone (one only) or in combination of two or more.

The content of the ethylenically unsaturated hydrocarbon group (the number of moles of the ethylenically unsaturated hydrocarbon group per unit mass) in the first organopolysiloxane is, in view of toughness and flexibility of the cured product, for example, 0.005 to 10 mmol/g, or preferably 0.01 to 5 mmol/g.

When the content of the ethylenically unsaturated hydrocarbon group in the first organopolysiloxane is below 0.005 mmol/g, the toughness of the cured product may be insufficient. When the content of the ethylenically unsaturated hydrocarbon group exceeds 10 mmol/g, the flexibility of the cured product may be insufficient.

The content of the silanol group (the number of moles of the silanol group per unit mass) in the first organopolysiloxane is, for example, 0.01 to 10 mmol/g, or preferably 0.02 to 5 mmol/g.

The number average molecular weight of the first organopolysiloxane is, for example, 1000 to 100000, or preferably 5000 to 50000. The number average molecular weight is measured with a gel permeation chromatography (GPC: calibrated with standard polystyrene equivalent).

The viscosity of the first organopolysiloxane (at 25° C.) is, in view of toughness of the cured product, for example, 100 to 500000 mPa·s, or preferably 300 to 200000 mPa·s. The viscosity of the first organopolysiloxane can be measured using a B-type viscometer.

The first organopolysiloxane is blended in 100 parts by mass of the silicone resin composition at a mixing ratio of, for example, 0.1 to 99.9 parts by mass, or preferably 1 to 99 parts by mass.

The second organopolysiloxane has, in one molecule, at least two hydrosilyl groups without having an ethylenically unsaturated hydrocarbon group. To be specific, the second organopolysiloxane includes an organopolysiloxane containing a hydrogen atom in its side chain represented by the following formula (4) and a hydrogen-terminated organopolysiloxane represented by the following formula (5).

Formula (4):

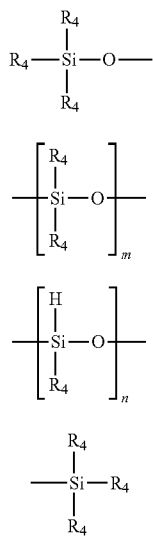

P

Q

R

S (where, in formula, P to S represent a constituent unit, P and S represent an end unit, and Q and R represent a repeating unit. $R_4$ represents a monovalent hydrocarbon group selected from a saturated hydrocarbon group and an aromatic hydrocarbon group. "m" represents an integer of 0 or 1 or more and "n" represents an integer of 2 or more.)

Formula (5):

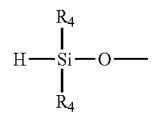

T

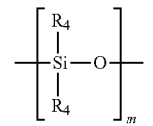

U

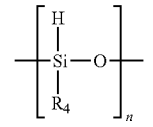

V

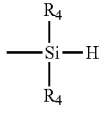

W (where, in formula, T to W represent a constituent unit, T and W represent an end unit, and U and V represent a repeating unit. $R_4$ represents a monovalent hydrocarbon group selected from a saturated hydrocarbon group and an aromatic hydrocarbon group. "m" represents an integer of 1 or more and "n" represents an integer of 0 or 1 or more.)

In the above-described formulas (4) and (5), an example of the monovalent hydrocarbon group represented by $R_4$ includes the same hydrocarbon group as $R_1$ in the first organopolysiloxane described above.

In the above-described formula (4), "m" is, for example, 0 to 10000, or preferably 0 to 1000 and "n" is, for example, 2 to 1000, or preferably 2 to 100.

In the above-described formula (5), "m" is, for example, 1 to 10000, or preferably 1 to 1000 and "n" is, for example, 0 to 1000, or preferably 0 to 100.

Examples of the second organopolysiloxane include a straight chain structure of dimethylhydrosilyl-terminated polydimethylsiloxane (corresponding to the above-described formula (5)), dimethylhydrosilyl-terminated dimethylsiloxane-diphenylsiloxane copolymer (corresponding to the above-described formula (5)), dimethylhydrosilyl-terminated polymethylphenylsiloxane (corresponding to the above-described formula (5)), dimethylhydrosilyl-terminated dimethylsiloxane-diethylsiloxane copolymer (corresponding to the above-described formula (5)), trimethylsiloxy-terminated dimethylsiloxane-methylhydrosiloxane copolymer (corresponding to the above-described formula (4)), and trimethylsiloxy-terminated polymethylhydrosiloxane (corresponding to the above-described formula (4)). The molecular structure of the second organopolysiloxane is not limited to the above-described straight chain structure and may be, for example, a cyclic chain structure, a branched chain structure, or a three dimensional network structure.

Of the second organopolysiloxanes, preferably, an organopolysiloxane containing a hydrogen atom in its side chain represented by the above-described formula (4) is used, or more preferably, a trimethylsiloxy-terminated dimethylsiloxane-methylhydrosiloxane copolymer is used.

The second organopolysiloxanes can be used alone (one only) or in combination of two or more.

The content of the hydrosilyl group (the number of moles of the hydrosilyl group per unit mass) in the second organopolysiloxane is, in view of toughness and flexibility of the cured product, for example, 0.005 to 10 mmol/g, or preferably 0.01 to 10 mmol/g.

When the content of the hydrosilyl group in the second organopolysiloxane is below 0.005 mmol/g, the toughness of the cured product may be insufficient. When the content of the hydrosilyl group exceeds 10 mmol/g, the flexibility of the cured product may be insufficient.

The number average molecular weight of the second organopolysiloxane is, for example, 1000 to 100000, or preferably 1000 to 50000. The number average molecular weight is measured with a gel permeation chromatography (GPC: calibrated with standard polystyrene equivalent).

The viscosity of the second organopolysiloxane (at 25° C.) is, in view of toughness of the cured product, for example, 10 to 500000 mPa·s, or preferably 10 to 100000 mPa·s. The viscosity of the second organopolysiloxane can be measured using a B-type viscometer.

The second organopolysiloxane is blended in 100 parts by mass of the silicone resin composition at a mixing ratio of, for example, 0.1 to 99.9 parts by mass, or preferably 1 to 99 parts by mass.

The second organopolysiloxane is, in view of toughness of the cured product, blended at a mixing ratio of, for example, 0.1 to 1000 parts by mass, preferably 1 to 100 parts by mass, more preferably 10 to 90 parts by mass, or even more preferably 20 to 50 parts by mass with respect to 100 parts by mass of the first organopolysiloxane.

In the silicone resin composition, the molar ratio (the ethylenically unsaturated hydrocarbon group/the hydrosilyl group) of the ethylenically unsaturated hydrocarbon group in the first organopolysiloxane to the hydrosilyl group in the second organopolysiloxane is, for example, 1/50 to 50/1, or preferably 1/5 to 5/1.

In the silicone resin composition, the molar ratio (the silanol group in the first organopolysiloxane/the hydrosilyl group in the second organopolysiloxane) of the silanol group in the first organopolysiloxane to the hydrosilyl group in the second organopolysiloxane is, for example, 1/150 to 50/1, or preferably 1/110 to 5/1.

Examples of the hydrosilylation catalyst include a platinum catalyst such as platinum black, platinum chloride, chloroplatinic acid, a platinum olefin complex, a platinum carbonyl complex, and platinum acetyl acetate; a palladium catalyst; and a rhodium catalyst.

Of the hydrosilylation catalysts, in view of transparency of the cured product, compatibility with the silicone resin composition, and catalyst activity, preferably, a platinum catalyst is used, more preferably, a platinum olefin complex and a platinum carbonyl complex are used, and to be specific, a platinum-1,3-divinyl-1,1,3,3-tetramethyldisiloxane complex is used.

The hydrosilylation catalyst accelerates the hydrosilylation of the ethylenically unsaturated hydrocarbon group in the first organopolysiloxane with the hydrosilyl group in the second organopolysiloxane.

The hydrosilylation catalyst may be prepared as a solution in a known solvent (such as toluene).

The hydrosilylation catalyst is blended into the silicone resin composition at a mixing ratio of, for example, $1.0\times10^{-4}$ to 0.5 parts by mass, or preferably $1.0\times10^{-3}$ to 0.5 parts by mass with respect to 100 parts by mass of the first organopolysiloxane.

The hydrosilylation catalyst is blended into the silicone resin composition at a mixing ratio of, for example, $1.0\times10^{-6}$ to $5.0\times10^{-3}$ mmol/g, or preferably $1.0\times10^{-5}$ to $5.0\times10^{-3}$ mmol/g with respect to 1 mmol/g, which is the content of the ethylenically unsaturated hydrocarbon group in the first organopolysiloxane in the silicone resin composition.

An example of the hydrosilylation retarder includes a quaternary ammonium hydroxide including a tetraalkyl ammonium hydroxide such as tetramethyl ammonium hydroxide, tetraethyl ammonium hydroxide, tetrapropyl ammonium hydroxide, tetrahexyl ammonium hydroxide, and tetrabutyl ammonium hydroxide and a trialkyl ammonium hydroxide such as hexadecyltrimethyl ammonium hydroxide and benzyltrimethyl ammonium hydroxide.

The hydrosilylation retarders can be used alone (one only) or in combination of two or more.

Of the hydrosilylation retarders, preferably, a tetraalkyl ammonium hydroxide is used, more preferably, a tetraalkyl ammonium hydroxide containing an alkyl group having 1 to 4 carbon atoms is used, or even more preferably, tetramethyl ammonium hydroxide is used.

The hydrosilylation retarder is, in view of catalyst activity and easy availability, preferably used as an aqueous solution or an alcohol solution and is, in view of transparency of the cured product and handling ability, preferably used as an alcohol solution.

The hydrosilylation retarder stabilizes the hydrosilylation catalyst and suppresses the hydrosilylation of the ethylenically unsaturated hydrocarbon group with the hydrosilyl group. The hydrosilylation retarder also accelerates a condensation reaction of the silanol group.

The hydrosilylation retarder is blended into the silicone resin composition at a mixing ratio of, for example, $1.0\times10^{2}$ to $1.0\times10^{6}$ parts by mass, or preferably $1.0\times10^{3}$ to $1.0\times10^{5}$ parts by mass with respect to 100 parts by mass of the hydrosilylation catalyst.

When the mixing ratio of the hydrosilylation retarder is below $1.0\times10^{2}$ parts by mass, a sufficient suppressing effect on curing may not be obtained. When the mixing ratio of the hydrosilylation retarder exceeds $1.0\times10^{6}$ parts by mass, there may be a case where it becomes difficult to cure the silicone resin composition or the heat resistance of the cured product is reduced.

A filler, as an optional component, can be added to the silicone resin composition as long as it does not damage the effect of the present invention.

Examples of the filler include an inorganic filler such as silica, titanium oxide, zirconium oxide, magnesium oxide, zinc oxide, iron oxide, aluminum hydroxide, calcium carbonate, layered mica, carbon black, diatomite, a glass fiber, and a phosphor (an oxide phosphor, a nitride phosphor, and an oxynitride phosphor activated by a lanthanoid element) and an organic silicon treatment filler in which the inorganic filler is subjected to a surface treatment with an organic silicon compound such as organoalkoxysilane, organochlorosilane, or organosilazane.

The filler is blended into the silicone resin composition at a mixing ratio of, for example, 1 to 100 parts by mass, or preferably 1 to 50 parts by mass with respect to 100 parts by mass of the first organopolysiloxane.

An additive, as another optional component, may be added to the silicone resin composition at an appropriate proportion as long as it does not damage the effect of the present invention. Examples of the additives include antioxidants, modifiers, surfactants, dyes, pigments, discoloration inhibitors, ultraviolet absorbers, anti-crepe hardening agents, plasticizers, thixotrophy imparting agents, and fungicides.

In order to prepare the silicone resin composition, the first organopolysiloxane, the second organopolysiloxane, the hydrosilylation catalyst, the hydrosilylation retarder, and the above-described optional component such as a filler as required are blended at the above-described mixing proportion to be stirred and mixed at, for example, 0 to 60° C. for, for example, 1 to 120 minutes.

According to the silicone resin composition, the first organopolysiloxane having, in one molecule, both at least two ethylenically unsaturated hydrocarbon groups and at least two silanol groups; the second organopolysiloxane having, in one molecule, at least two hydrosilyl groups without having an ethylenically unsaturated hydrocarbon group; the hydrosilylation catalyst; and the hydrosilylation retarder are contained.

Therefore, it is possible to suppress a hydrosilylation reaction of the ethylenically unsaturated hydrocarbon group in the first organopolysiloxane with the hydrosilyl group in the second organopolysiloxane by the hydrosilylation retarder and to progress a condensation reaction of the silanol group in the first organopolysiloxane with a silanol group produced by allowing the hydrosilyl group in the second organopolysiloxane to react with water.

As a result, the silicone resin composition can be uniformly semi-cured.

In the silicone resin composition, the hydrosilylation retarder contains a quaternary ammonium hydroxide.

Therefore, the hydrosilylation retarder can accelerate the condensation reaction of the silanol group, while stabilizing the hydrosilylation catalyst and suppressing the hydrosilylation of the ethylenically unsaturated hydrocarbon group with the hydrosilyl group.

As a result, the silicone resin composition can be semi-cured, while the hydrosilylation of the ethylenically unsaturated hydrocarbon group with the hydrosilyl group is suppressed.

The silicone resin composition contains the first organopolysiloxane having, in one molecule, both at least two ethylenically unsaturated hydrocarbon groups and at least two silanol groups.

In this regard, the above-described effect can be achieved at lower cost, compared to the case where the first organopolysiloxane has, in one molecule, both at least two ethylenically unsaturated hydrocarbon groups and at least two hydrosilyl groups.

Next, a method for producing a silicone resin sheet of the present invention is described.

In order to produce the silicone resin sheet, first, the above-described silicone resin composition is applied onto a substrate.

Examples of the substrate include a release sheet (for example, an organic polymer film such as PET) whose surface is subjected to a release treatment, a ceramic, and a metal board.

Examples of a method for applying the silicone resin composition onto the substrate include a casting, a spin coating, and a roll coating.

The silicone resin composition has a coating film thickness in the range of, for example, 0.1 to 100 mm, or preferably 0.1 to 5 mm.

Next, the silicone resin composition applied onto the substrate is heated at, for example, 20 to 200° C., or preferably 40 to 150° C., for, for example, 0.1 to 120 minutes, or preferably 1 to 60 minutes.

In this way, the silicone resin composition applied onto the substrate is brought into a semi-cured state (in a B-stage state), so that the silicone resin sheet is obtained.

The obtained silicone resin sheet has a thickness in the range of, for example, 100 to 10000 μm, or preferably 100 to 3000 μm.

The compressive elastic modulus (measured by a hardness test in Examples to be described later) of the obtained silicone resin sheet is, for example, 1000 Pa to 2 MPa, or preferably 1000 Pa to 1 MPa.

After the obtained silicone resin sheet is stored at 5° C. for 24 hours, the compressive elastic modulus of the silicone resin sheet is, for example, 1000 Pa to 2 MPa, or preferably 1000 Pa to 1 MPa.

The obtained silicone resin sheet has the percentage (the hardness retention rate) of the compressive elastic modulus after being stored with respect to that immediately after being fabricated in the range of, for example, 80 to 200%, or preferably 90 to 180%.

The silicone resin sheet is obtained by semi-curing the silicone resin composition, so that a uniform semi-cured state thereof is achieved and therefore, the handling ability can be improved.

According to the silicone resin sheet, the hardness thereof is adjusted to have a predetermined hardness, so that the handling ability can be further improved.

The silicone resin sheet of the present invention can be effectively used as an encapsulating material, a filling material, or the like in various industrial fields. Above all, the silicone resin sheet of the present invention is preferably used as an encapsulating material of the optical semiconductor element device.

Next, an optical semiconductor element device 1 including an encapsulating layer 7 obtained by curing the obtained silicone resin sheet is described.

The optical semiconductor element device 1 includes a circuit board 2 and a light emitting diode 3 as an optical semiconductor element.

The circuit board 2 includes a base board 4 and a wiring pattern 5 which is formed on the upper surface thereof. An external electric power is supplied to the circuit board 2.

The base board 4 is formed into a generally rectangular flat plate shape in plane view and is formed of, for example, a metal material such as aluminum, a ceramic material such as alumina, or a resin material such as polyimide.

The wiring pattern 5 electrically connects a terminal of the light emitting diode 3 with a terminal (not shown) of a power source (not shown) for supplying electric power to the light emitting diode 3. The wiring pattern 5 is formed of, for example, a conductive material such as copper or iron.

The light emitting diode 3 is provided on the base board 4. The light emitting diode 3 is electrically connected to (wire-bonding mounted on or flip-chip mounted on) the wiring pattern 5. The light emitting diode 3 emits light based on electric power from the circuit board 2.

The optical semiconductor element device 1 includes the encapsulating layer 7 which encapsulates the light emitting diode 3.

The encapsulating layer 7 is laminated at the upper side of the base board 4 so as to cover the light emitting diode 3.

In order to form the encapsulating layer 7, first, the obtained silicone resin sheet is laminated on the base board 4 and is compressively bonded thereto, for example, using a laminator, at a temperature of, for example, 100 to 200° C., or preferably 120 to 180° C. at a pressure of, for example, 0.01 to 10 MPa, or preferably 0.1 to 1 MPa for, for example, 2 to 600 seconds.

Next, the silicone resin sheet compressively bonded onto the base board 4 is heated at, for example, 120 to 250° C., or preferably 150 to 200° C., for, for example, 0.5 to 48 hours, or preferably 1 to 24 hours.

In this way, the silicone resin sheet is cured, so that the encapsulating layer 7 is obtained.

According to the optical semiconductor element device 1, the encapsulating layer 7 is obtained by curing the silicone resin sheet, so that the light emitting diode 3 can be easily encapsulated.

EXAMPLES

While the present invention will be described hereinafter in further detail with reference to Examples and Comparative Examples, the present invention is not limited to these Examples and Comparative Examples.

1. Fabrication of Silicone Resin Sheet

Example 1

10.2 μL (0.009 mmol) of a methanol solution with a concentration of 10% tetramethyl ammonium hydroxide was added to 20 g of a hydroxy group-terminated vinylmethylsiloxane-dimethylsiloxane copolymer (a vinyl group content of 0.86 mmol/g, a silanol group content of 0.16 mmol/g, a number average molecular weight of 34000, the viscosity (at 25° C.) of 3100 mPa·s), and 7.23 g of an organohydrogenpolysiloxane (a trimethylsiloxy-terminated dimethylsiloxane-methylhydrosiloxane copolymer: a hydrosilyl group content of 7.14 mmol/g, a number average molecular weight of 2000)

and 1.3 μL of a platinum carbonyl complex solution (a platinum concentration of 2 mass %) were added thereto.

The molar ratio (the vinyl group/the hydrosilyl group) of the vinyl group content in the hydroxy group-terminated vinylmethylsiloxane-dimethylsiloxane copolymer to the hydrosilyl group content in the organohydrogenpolysiloxane was 1/3.

The molar ratio (the silanol group content in the hydroxy group-terminated vinylmethylsiloxane-dimethylsiloxane copolymer/the hydrosilyl group content in the organohydrogenpolysiloxane) of the silanol group content in the hydroxy group-terminated vinylmethylsiloxane-dimethylsiloxane copolymer to the hydrosilyl group content in the organohydrogenpolysiloxane was 1/16.

Next, the obtained mixture was stirred to be mixed at 25° C. for 0.1 hours, so that a silicone resin composition was prepared.

The obtained silicone resin composition was applied onto a polyethylene terephthalate film (manufactured by Nippa CO., LTD, SS4C) with a coating film thickness of 600 μm and was heated at 120° C. for 1 to 10 minutes to semi-cure the silicone resin composition, so that a silicone resin sheet was fabricated.

Example 2

A silicone resin sheet was fabricated in the same manner as in the above-described Example 1, except that 20 g of a hydroxy group-terminated vinylmethylsiloxane-dimethylsiloxane copolymer (a vinyl group content of 0.81 mmol/g, a silanol group content of 0.04 mmol/g, a number average molecular weight of 51700, the viscosity (at 25° C.) of 13000 mPa·s) was used instead of a hydroxy group-terminated vinylmethylsiloxane-dimethylsiloxane copolymer (a vinyl group content of 0.86 mmol/g, a hydrosilyl group content of 0.16 mmol/g, a number average molecular weight of 34000, the viscosity (at 25° C.) of 3100 mPa·s), and the mixing amount of the methanol solution with a concentration of 10% tetramethyl ammonium hydroxide was 9.6 μl, (0.009 mmol) and the mixing amount of the organohydrogenpolysiloxane was 6.77 g.

Also in Example 2, the molar ratio (the vinyl group/the hydrosilyl group) of the vinyl group content in the hydroxy group-terminated vinylmethylsiloxane-dimethylsiloxane copolymer to the hydrosilyl group content in the organohydrogenpolysiloxane was 1/3.

The molar ratio (the silanol group content in the hydroxy group-terminated vinylmethylsiloxane-dimethylsiloxane copolymer/the hydrosilyl group content in the organohydrogenpolysiloxane) of the silanol group content in the hydroxy group-terminated vinylmethylsiloxane-dimethylsiloxane copolymer to the hydrosilyl group content in the organohydrogenpolysiloxane was 1/60.

Example 3

A silicone resin sheet was fabricated in the same manner as in the above-described Example 1, except that 20 g of a hydroxy group-terminated vinylmethylsiloxane-dimethylsiloxane copolymer (a vinyl group content of 0.68 mmol/g, a silanol group content of 0.02 mmol/g, a number average molecular weight of 90300, the viscosity (at 25° C.) of 140000 mPa·s) was used instead of a hydroxy group-terminated vinylmethylsiloxane-dimethylsiloxane copolymer (a vinyl group content of 0.86 mmol/g, a silanol group content of 0.16 mmol/g, a number average molecular weight of 34000, the viscosity (at 25° C.) of 3100 mPa·s), and the mixing amount of the methanol solution with a concentration of 10% tetramethyl ammonium hydroxide was 8.1 μL (0.007 mmol), the mixing amount of the organohydrogenpolysiloxane was 5.72 g, and the mixing amount of the platinum carbonyl complex solution (a platinum concentration of 2 mass %) was 1.1 μL.

Also in Example 3, the molar ratio (the vinyl group/the hydrosilyl group) of the vinyl group content in the hydroxy group-terminated vinylmethylsiloxane-dimethylsiloxane copolymer to the hydrosilyl group content in the organohydrogenpolysiloxane was 1/3.

The molar ratio (the silanol group content in the hydroxy group-terminated vinylmethylsiloxane-dimethylsiloxane copolymer/the hydrosilyl group content in the organohydrogenpolysiloxane) of the silanol group content in the hydroxy group-terminated vinylmethylsiloxane-dimethylsiloxane copolymer to the hydrosilyl group content in the organohydrogenpolysiloxane was 1/102.

Example 4

A silicone resin sheet was fabricated in the same manner as in the above-described Example 1, except that 20 g of a hydroxy group-terminated vinylmethylsiloxane-dimethylsiloxane copolymer (a vinyl group content of 1.41 mmol/g, a silanol group content of 0.16 mmol/g, a number average molecular weight of 35200, the viscosity (at 25° C.) of 6500 mPa·s) was used instead of a hydroxy group-terminated vinylmethylsiloxane-dimethylsiloxane copolymer (a vinyl group content of 0.86 mmol/g, a silanol group content of 0.16 mmol/g, a number average molecular weight of 34000, the viscosity (at 25° C.) of 3100 mPa·s), and the mixing amount of the methanol solution with a concentration of 10% tetramethyl ammonium hydroxide was 16.8 μL (0.015 mmol), the mixing amount of the organohydrogenpolysiloxane was 11.9 g, and the mixing amount of the platinum carbonyl complex solution (a platinum concentration of 2 mass %) was 2.2 μl, Also in Example 4, the molar ratio (the vinyl group/the hydrosilyl group) of the vinyl group content in the hydroxy group-terminated vinylmethylsiloxane-dimethylsiloxane copolymer to the hydrosilyl group content in the organohydrogenpolysiloxane was 1/3.

The molar ratio (the silanol group content in the hydroxy group-terminated vinylmethylsiloxane-dimethylsiloxane copolymer/the hydrosilyl group content in the organohydrogenpolysiloxane) of the silanol group content in the hydroxy group-terminated vinylmethylsiloxane-dimethylsiloxane copolymer to the hydrosilyl group content in the organohydrogenpolysiloxane was 1/27.

Comparative Example 1

20 g (0.071 mmol) of a vinyl-terminated polydimethylsiloxane, 1.12 g of an organohydrogenpolysiloxane (a trimethylsiloxy-terminated dimethylsiloxane-methylhydrosiloxane copolymer: a hydrosilyl group content of 3.82 mmol/g, a number average molecular weight of 2000), 1.0 ml of a platinum carbonyl complex solution (a platinum concentration of 2 mass %), and 7.6 ml (0.007 mmol) of a methanol solution with a concentration of 10% tetramethyl ammonium hydroxide were blended, and the obtained mixture was stirred to be mixed at room temperature (at 20° C.) for 10 minutes, so that a silicone resin composition was prepared.

The obtained silicone resin composition was applied onto a polyethylene terephthalate film (manufactured by Nippa CO., LTD, SS4C) with a coating film thickness of 600 μm and was heated at 120° C. for 1 to 5 minutes. The inside of the silicone resin composition remained in a liquid state and the surface thereof only was cured. That is, the silicone resin composition was brought into a sheet in which the silicone resin composition in a liquid state remained inside to have a non-uniform coating film surface.

In Comparative Example 1, a silicone resin sheet in a semi-cured state could not be fabricated.

Comparative Example 2

A silicone resin composition was prepared in the same manner as in Example 2, except that tetramethyl ammonium hydroxide was not blended.

The obtained silicone resin composition was applied onto a biaxially-oriented polyester film (manufactured by Mitsubishi Chemical Polyester Film Corporation, 50 μm) with a coating film thickness of 500 μm and was heated at 120° C. for 1 to 6 minutes to semi-cure the silicone resin composition, so that a silicone resin sheet was fabricated.

2. Evaluation

The following evaluation was performed on the silicone resin sheets in Examples and Comparative Example.

(1) Hardness Test

Each of the surfaces of the silicone resin sheets in Examples and Comparative Example immediately after the fabrication was pressed using a precision load measuring device (manufactured by AIKOH ENGINEERING CO., LTD., MODEL-1605 II VL) (the maximum press load of a load cell in use: 5 N, the cross-sectional area of a compression terminal: 23.75 mm$^2$). The pushed-in amount of the compression terminal with respect to the silicone resin sheet was set to be 100 μm.

The slope of the approximation straight line in the range of 80 to 100 μm of the pushed-in amount was calculated from the correlation curve of the pushed-in amount and the press load. The value obtained by dividing the slope by the cross-sectional area (23.75 mm$^2$) of the compression terminal was obtained as the compressive elastic modulus (MPa). The obtained compressive elastic modulus was defined as a reference of the hardness of the silicone resin sheet. That is, the larger value of the compressive elastic modulus shows that the silicone resin sheet is harder.

(2) Storage Stability Test

Each of the silicone resin sheets in Examples and Comparative Example was stored at 5° C. for 24 hours and the compressive elastic modulus thereof was calculated in the same manner as in the above-described hardness test.

The percentage of the compressive elastic modulus of the silicone resin sheet after being stored with respect to that immediately after being fabricated was calculated. The obtained value was defined as the hardness retention. The results are shown in Table 1.

The value of the hardness retention closer to 100% shows the more excellent storage stability of the silicone resin sheet. In the following, the criteria of judgment for the storage stability are represented.

Good: Harness retention exceeds 50% and is below 200%.
Bad: Hardness retention is not more than 50% or not less than 200%.

(3) State Evaluation of Silicone Resin Sheet

In each of the silicone resin sheets in Examples and Comparative Examples, it was confirmed whether or not a liquid component (an unreacted component) was left visually and tactually to be determined in accordance with the following evaluation criteria. The results are shown in Table 1.

Good: Liquid component was not left.
Bad: Liquid component was left.

TABLE 1

|  | Ex. 1 | Ex. 2 | Ex. 3 | Ex. 4 | Comp. Ex. 1 | Comp. Ex. 2 |
|---|---|---|---|---|---|---|
| Compressive Elastic Modulus Immediately After Fabrication (MPa) | 0.022 | 0.006 | 0.005 | 0.014 | — | 0.035 |
| Compressive Elastic Modulus After Storage (MPa) | 0.024 | 0.008 | 0.008 | 0.013 | — | 0.095 |
| Hardness Retention (%) | 110 | 130 | 170 | 90 | — | 270 |
| Sheet State Evaluation | Good | Good | Good | Good | Bad | Good |
| Storage Stability | Good | Good | Good | Good | — | Bad |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A silicone resin composition comprising:
   a first organopolysiloxane having, in one molecule, both at least two ethylenically unsaturated hydrocarbon groups and at least two silanol groups;
   a second organopolysiloxane having, in one molecule, at least two hydrosilyl groups without having an ethylenically unsaturated hydrocarbon group;
   a hydrosilylation catalyst; and
   a hydrosilylation retarder containing a quaternary ammonium hydroxide.

2. A silicone resin sheet obtained by semi-curing a silicone resin composition, wherein the silicone resin composition comprises:
   a first organopolysiloxane having, in one molecule, both at least two ethylenically unsaturated hydrocarbon groups and at least two silanol groups;
   a second organopolysiloxane having, in one molecule, at least two hydrosilyl groups without having an ethylenically unsaturated hydrocarbon group;
   a hydrosilylation catalyst; and
   a hydrosilylation retarder,
   wherein the compressive elastic modulus thereof is 1000 Pa to 2 MPa.

3. An optical semiconductor element device comprising:
   an optical semiconductor element and
   an encapsulating layer which is obtained by curing a silicone resin sheet and encapsulates the optical semiconductor element, wherein
   the silicone resin sheet is obtained by semi-curing a silicone resin composition, and the silicone resin composition comprises:
   a first organopolysiloxane having, in one molecule, both at least two ethylenically unsaturated hydrocarbon groups and at least two silanol groups;
   a second organopolysiloxane having, in one molecule, at least two hydrosilyl groups without having an ethylenically unsaturated hydrocarbon group; a hydrosilylation catalyst; and a hydrosilylation retarder containing a quaternary ammonium hydroxide.

4. A method for producing a silicone resin sheet comprising the steps of:
applying a silicone resin composition onto a substrate and heating the silicone resin composition applied onto the substrate at 20 to 200° C. for 0.1 to 120 minutes, wherein the silicone resin composition comprises:
a first organopolysiloxane having, in one molecule, both at least two ethylenically unsaturated hydrocarbon groups and at least two silanol groups;
a second organopolysiloxane having, in one molecule, at least two hydrosilyl groups without having an ethylenically unsaturated hydrocarbon group;
a hydrosilylation catalyst; and
a hydrosilylation retarder containing a quaternary ammonium hydroxide.

5. A method for producing a silicone resin sheet comprising the steps of:
applying a silicone resin composition onto a substrate and heating the silicone resin composition applied onto the substrate at 20 to 200° C. for 0.1 to 120 minutes, wherein the silicone resin composition comprises:
a first organopolysiloxane having, in one molecule, both at least two ethylenically unsaturated hydrocarbon groups and at least two silanol groups;
a second organopolysiloxane having, in one molecule, at least two hydrosilyl groups without having an ethylenically unsaturated hydrocarbon group;
a hydrosilylation catalyst; and
a hydrosilylation retarder,
wherein the compressive elastic modulus of the silicone resin sheet is 1000 Pa to 2 MPa.

* * * * *